United States Patent
Albin, Jr. et al.

(10) Patent No.: US 6,704,330 B1
(45) Date of Patent: Mar. 9, 2004

(54) MULTIPLEXING SYSTEM AND METHOD FOR SERVICING SERIALLY LINKED TARGETS OR RAID DEVICES

(75) Inventors: Donald Jay Albin, Jr., Tucson, AZ (US); Robert George Emberty, Tucson, AZ (US); Craig Anthony Klein, Tucson, AZ (US); David Adam Sinclair, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,174

(22) Filed: May 18, 1999

(51) Int. Cl.[7] .................................................. H04J 3/14
(52) U.S. Cl. ........................................ 370/537; 370/535
(58) Field of Search ................................ 370/535, 536, 370/537, 532

(56) References Cited

U.S. PATENT DOCUMENTS

| | | |
|---|---|---|
| 3,704,363 A | 11/1972 | Salmassy et al. |
| 5,440,564 A * | 8/1995 | Ovadia et al. |
| 5,455,934 A | 10/1995 | Holland et al. |
| 5,586,250 A | 12/1996 | Carbonneau et al. |
| 5,745,671 A * | 4/1998 | Hodges ................. 395/182.04 |
| 5,812,754 A | 9/1998 | Lui et al. |
| 5,815,650 A | 9/1998 | Apperley et al. |
| 5,835,954 A * | 11/1998 | Duyanovich et al. ....... 711/162 |

* cited by examiner

Primary Examiner—Kenneth Vanderpuye
(74) Attorney, Agent, or Firm—Dale M. Crockatt; Bracewell & Patterson, L.L.P.

(57) ABSTRACT

A multiplexing system and method for servicing serially linked targets or RAID devices. The multiplexing system couples service interfaces from various targets and devices. The multiplexing system provides a single service link to a single service unit interface. The single service link allows easy access/communications or remote access/communications to an individual target or disk drive within the RAID system. A service unit is directly or remotely coupled to the service unit interface. The multiplexing system has an outgoing multiplexer, an in-going multiplexer, and a multiplexer controller. The service unit communicates with the multiplexing system to select the desired target or disk drive to be serviced. The multiplexer controller detects incoming select target commands and compares incoming target address information with a presently defined multiplexer controller target address information. A switch command is activated or occurs when the incoming select target address information is different with the presently defined multiplexer controller target address information. The multiplexing system accordingly switches to a different target or disk drive to be looked at and serviced when a switch command has been activated or has occurred.

17 Claims, 4 Drawing Sheets

MULTIPLEXING SYSTEM AND METHOD FOR SERVICING SERIALLY LINKED TARGETS OR RAID DEVICES

BACKGROUND OF THE INVENTION

1. Technical Field

The present invention relates in general to a multiplexing system and method and in particular to a multiplexing system and method for servicing RAID devices. Still more particularly, the present invention relates to a multiplexing system and method that provides a single service link for multiple targets or disk drives within a RAID system, which allows easy access or remote access to an individual drive within the RAID system.

2. Description of the Related Art

RAID systems have an array of disk drives linked together. A RAID controller makes the array of disk drives within a RAID system look like one large and reliable disk. A typical RAID system has the disk drives serially linked together. FIG. 1 shows a prior art serial storage architecture (SSA) configuration 10 wherein the disk drives (DASD) 14, 20, 26, to N are serially linked together and linked to a SSA initiator 12. The SSA 10 is coupled to a controller card 36 via a device service interface (DSI) 32, that is, each of the disk drives (DASD) 14, 20, 26, to N are coupled to the controller card 36 via the DSI 32. A display 34, a serial node bypass card (SNBC) 38, and a power sequencer (PWR SQNR) 40 are coupled to the controller card 36. The controller card 36 also has a service link 37 that couples to a service unit interface 42. The SNBC 38 and the PWR SQNR 40 may also each have a service link that couples to a service unit interface 42. The service unit interface 42 of a disk drive, the controller card 36, the SNBC 38, or the PWR SQNR 40 receives and couples a service unit, such as the IBM RS232 service unit, to the respective device or sub-system.

When a drastic problem with a RAID disk drive occurs, data in the disk drive is not accessible. The disk drive is accessed by communicating with the controller card 36 and the DSI 32 at the back plane of the drawer of the disk drive. However, the DSI 32 is typically not functional when a drastic problem occurs, and the disk drive is unable to be accessed via the DSI 32. Points of failure at the controller card 36 and the DSI 32 prohibits access and communications to the respective disk drive.

The disk drive and the data therein would have to be accessed through a service unit interface 42, that is, coupling a RS232 service unit to the interface 42 of the disk drive to be serviced and to the interface 42 of the controller card 37. However, the disk drives 14, 20, 26, to N are located in drawers. One problem with these drawers is that the disk drive powers down when the drive latch is open. If the disk drive is powered down or is moved to another location for servicing, volatile data may be lost. Data written on the disk drive would most likely still exist, but data such as error registers would be lost. Therefore, due to the physical carrier of the disk drives, the service unit interface 42 is not able to be or not easily accessible by a service technician or other such personnel. Cumbersome and inconvenient solutions, such as cutting the front of the drive unit or drawer and using temporary connections from the service unit (RS232 unit) to the service unit interface 42, have been implemented to maintain the power of the disk drive while still being able to access the service unit interface 42.

It would therefore be advantageous and desirable to have a multiplexing system and method for servicing serially linked targets or RAID devices. It would be advantageous and desirable to have a multiplexing system and method that provides a single service link for multiple targets, which allows easy access or remote access to an individual target. It would be advantageous and desirable to have a multiplexing system and method that provides a single service link for multiple disk drives within a RAID system, which allows easy access or remote access to an individual drive within the RAID system. It would also be advantageous and desirable to provide a system and method that does not require physical alterations or powering down or moving of the target or disk drive that needs to be serviced.

SUMMARY OF THE INVENTION

It is therefore one object of the present invention to provide a multiplexing system and method for servicing targets or serially linked devices.

It is another object of the present invention to provide a multiplexing system and method for servicing RAID devices.

It is still another object of the present invention to provide a multiplexing system and method that provides a single service link for multiple targets or serially linked devices, which allows easy access or remote access to an individual target.

It is still another object of the present invention to provide a multiplexing system and method that provides a single service link for multiple disk drives within a RAID system, which allows easy access or remote access to an individual drive within the RAID system.

It is yet another object of the present invention to provide a system and method that does not require physical alterations or powering down or moving of the disk drive that needs to be serviced.

It is still yet another object of the present invention to provide a system and method that allows direct or remote access and communications with a target or drive within a number of serially linked targets or drives.

It is still another object of the present invention to allow service links from other computer devices to be linked to a common multiplexing or switching system.

The foregoing objects are achieved as is now described. A multiplexing system and method for servicing serially linked targets or RAID devices. The multiplexing system couples service interfaces from various targets and devices. The multiplexing system provides a single service link to a single service unit interface. The single service link allows easy access/communications or remote access/communications to an individual target or disk drive within the RAID system. A service unit is directly or remotely coupled to the service unit interface. The multiplexing system has an outgoing multiplexer, an in-going multiplexer, and a multiplexer controller. The service unit communicates with the multiplexing system to select the desired target or disk drive to be serviced. The multiplexer controller detects incoming select target commands and compares incoming target address information with a presently defined multiplexer controller target address information. A switch command is activated or occurs when the incoming select target address information is different with the presently defined multiplexer controller target address information. The multiplexing system accordingly switches to a different target or disk drive to be looked at and serviced when a switch command has been activated or has occurred.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
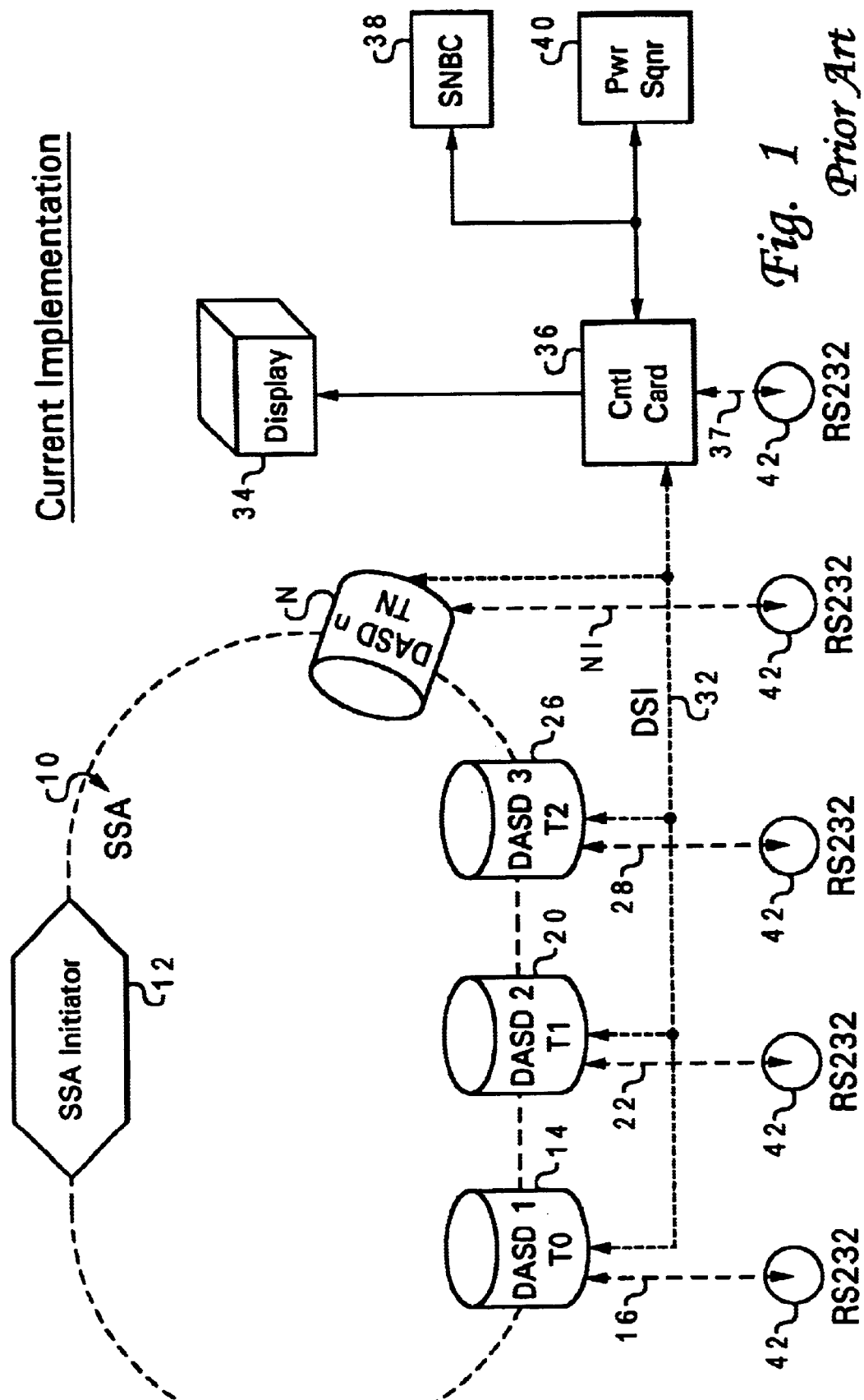
FIG. 1 is a block diagram of a prior art RAID serial storage architecture (SSA) coupled to a controller card and other devices and showing the individual service unit interfaces of each disk drive.

With reference now to the figures and in particular with reference to FIG. 1, a prior art RAID serial storage architecture (SSA) 10 is shown coupled to a controller card 36. A display 34, a serial node bypass card (SNBC) 38, and a power sequencer (PWR SQNR) 40 are coupled to the controller card 36. As stated earlier, the prior art SSA 10 show the individual service unit interfaces 42 of the desired target or disk drive 14, 20, 26 to N to be serviced having to be individually and manually accessed by the service technician to couple the service unit (i.e. IBM RS232 service unit). FIG. 1 shows that each of the targets or disk drives 14, 20, 26 to N are coupled to the controller card 36 via device service interface (DSI) link 32, but this link 32 is usually not functional when a drastic disk drive problem occurs. FIG. 1 shows that a service link 16 couples a service unit interface 42 to target or disk drive 14, a service link 22 couples an interface 42 to target or disk drive 20, a service link 28 couples an interface 42 to target or disk drive 26, and so on and so forth until a service link NI couples an interface 42 to target or disk drive N. The controller card 36 is also coupled to a service interface 42 via link 37. Various problems, as discussed earlier, are associated with this prior art configuration.

Figure 2:
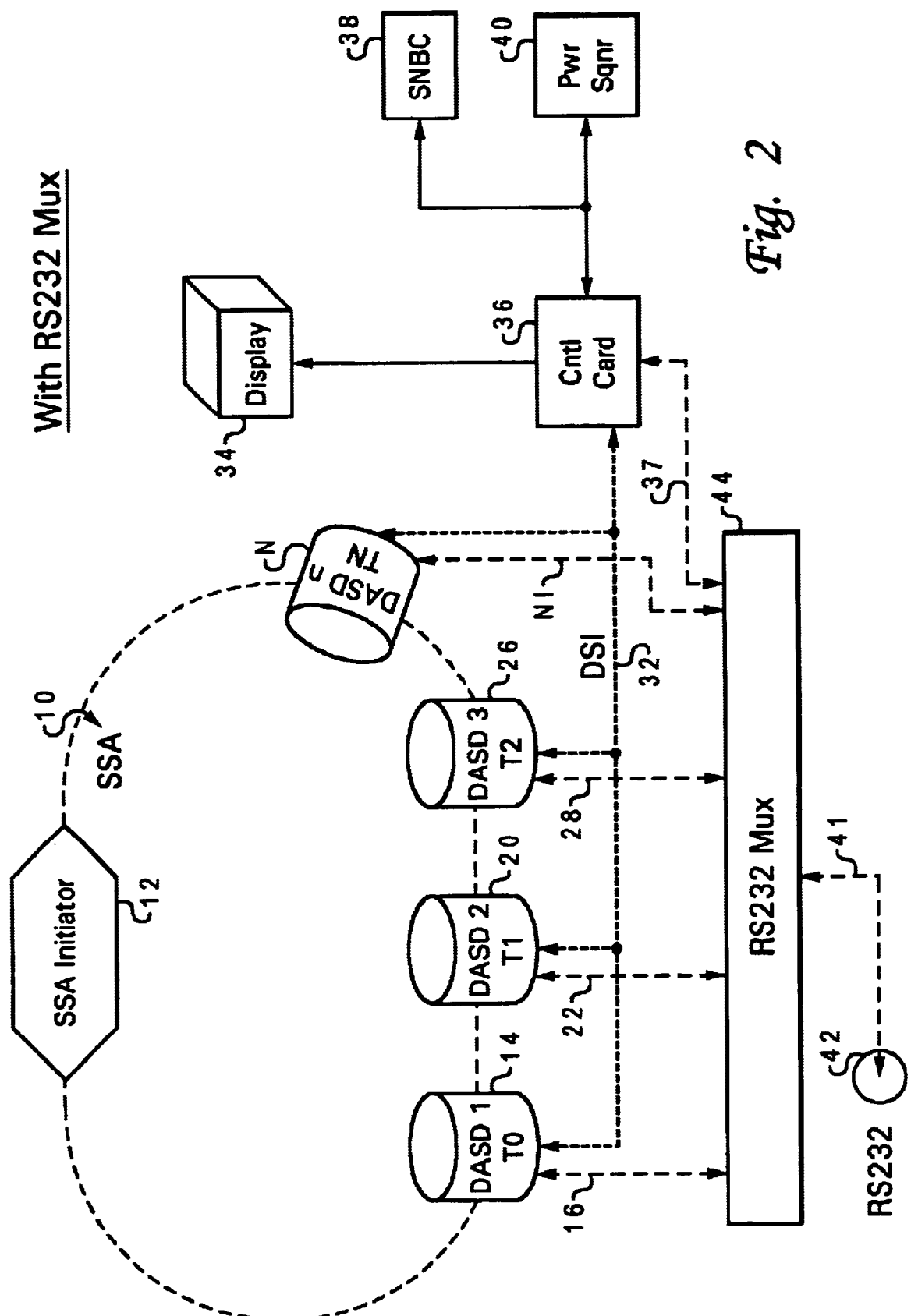
FIG. 2 is a block diagram of a RAID serial storage architecture (SSA) showing the present invention multiplexing system coupled to all of the individual service unit interfaces of each of the disk drives and other devices and sub-systems and providing a single service unit link for receiving and coupling a service unit.

With reference now to the figures and in particular with reference to FIG. 2, a multiplexing system 44 and respective method is implemented into the RAID SSA 10 for providing a single service link 41 to a single service unit interface 42 to multiple targets or disk drives 14, 20, 26 to N within a RAID system. The multiplexing system 44 couples the individual service links 16, 22, 28 to NI from respective targets or disk drives 14, 20, 26 to N. Also, the multiplexing system 44 couples the service interface 42 from the controller card 36 as well. The multiplexing system 44 may also couple the service interface 42 from the SNBC 38 and the PWR SQNR 40. The targets 14, 20, 26 to N include but are not limited to being disk drives, direct access storage devices (DASD), tape drives, optical juke boxes, robots, or other optical medium.

The multiplexing system 44 provides a single service link 41 to a single service unit interface 42, and the single service link 41 allows easy access/communications or remote access/communications to an individual target or disk drive within the RAID system. For example, a service unit, such as the RS232 service unit, is directly coupled to the service unit interface 42 at link 41 and is used respectively and generally at the interface 42. Alternatively, a remote communications system is coupled at the interface 42 at link 41, and a user is able to dial up and remotely access and communicate with the multiplexing system 44 via the remote communications system. When a service unit, such as a RS232 service unit, is coupled to and received by the single service unit interface 42 at link 41, the service unit uses the controller card 36 to communicate with the various targets or disk drives 14, 20, 26 to N.

Figure 3:
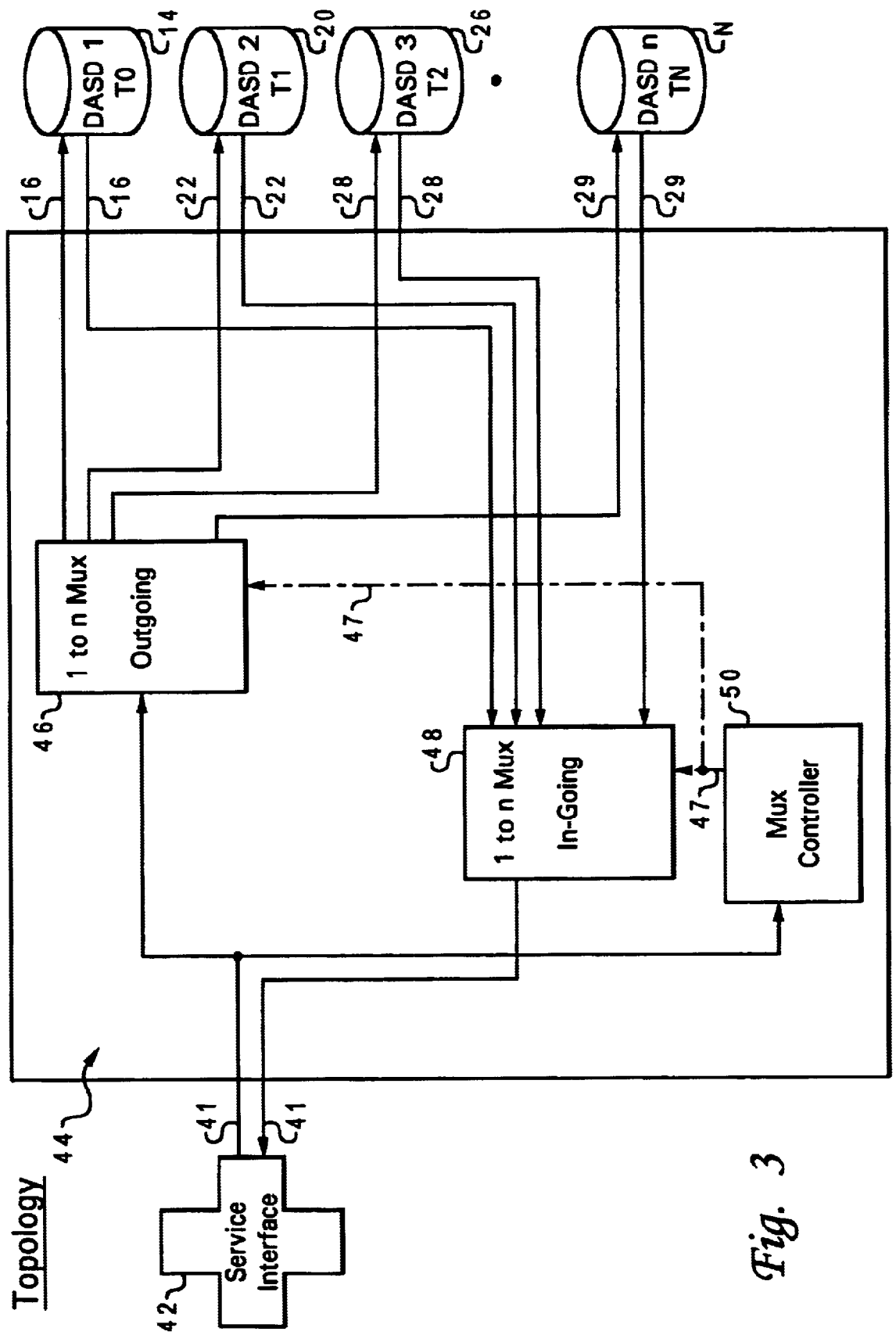
FIG. 3 shows a more detailed block diagram of the present invention multiplexing system.

With reference now to the figures and in particular with reference to FIG. 3, a topology and details of the multiplexing system 44 are shown. FIG. 3 shows that the multiplexing system 44 has an outgoing multiplexer 46, an in-going multiplexer 48, and a multiplexer controller 50. The multiplexer controller 50 is coupled and communicates with the outgoing multiplexer 46 and the in-going multiplexer 48 via link 47. The multiplexing system 44 may be in the form of a multiplexer chip, that is, the multiplexing system 44 may be an IBM RS232 multiplexer chip. The multiplexers 46 and 48 are standard multiplexers that exist or are already known in the art. The present invention is not in any way limited to the use of multiplexers, and any device that provides switching and the simultaneous sending of two or more signals may be used with the present invention.

Outgoing communications are directed from the service interface 42 to the outgoing multiplexer 46 and the multiplexer controller 50 and from the multiplexer 46 and the controller 50 to the targets or disk drives 14, 20, 26 to N. Incoming communications are directed from the targets or disk drives 14, 20, 26 to N to the in-going multiplexer 48 and from the multiplexer 48 to the service interface 42. The service unit or RS232 service unit is attached to the single service interface 42 via single service link 41. As referenced earlier, the multiplexing system 44 is coupled to the controller card 36 via the link 37. Thus, the service unit is able to directly couple to the service interface 42 via link 41 to access and communicate with the disk drives, or the service unit couples to a remote communications system that is coupled to the interface 42 at link 41 wherein the service unit is able to remotely access the multiplexing system 44 via interface 42 and link 41. The service unit uses the controller card 36 to access and communicate with the disk drives.

The service unit is able to be operated by a service technician or other such person whether directly or remotely to command access and communications with a particular target or disk drive 14, 20, 26, . . . N. The command is initialized to look at and communicate with one of the targets or disk drives 14, 20, 26, . . . N. The service unit (i.e. RS232 service unit) is used in its normal and conventional manner to provide service to a target or desired disk drive. The service unit communicates with the multiplexing system 44 to select the desired target or disk drive to be serviced. The multiplexer controller 50 is set up to detect when a switch command has occurred in switching to a different target or disk drive to be looked at and serviced.

Figure 4:
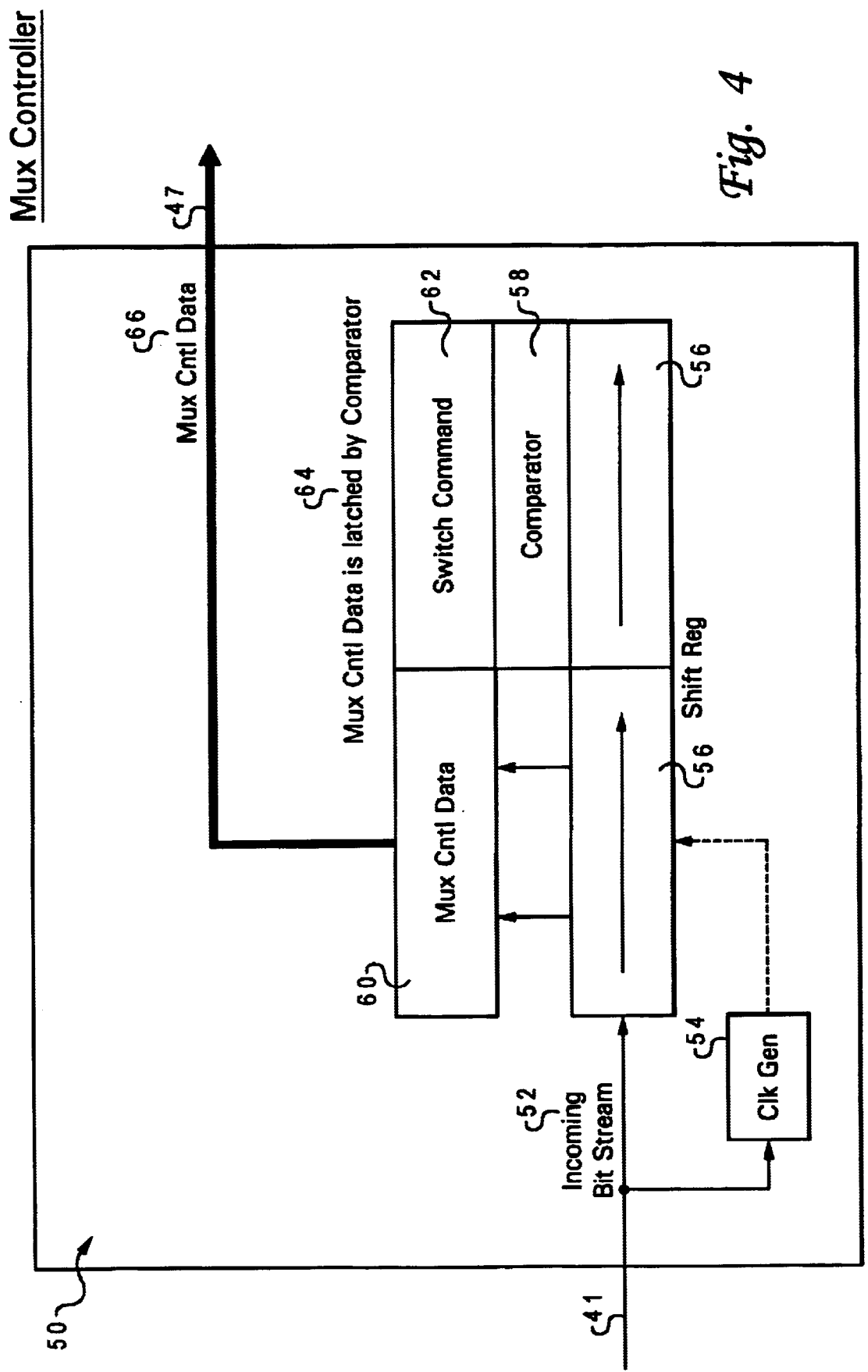
FIG. 4 shows a detailed block diagram of a controller for the present invention multiplexing system.

With reference now to the figures and in particular with reference to FIG. 4, a detailed diagram and configuration of the multiplexer controller 50 is shown. The multiplexer controller 50 receives an incoming bit stream 52 of data from the service unit via the service interface 42 and link 41. The incoming bit stream 52 contains the command and the address for looking and communicating with a particular target or disk drive. The incoming bit stream 52 is generated from the service unit, such as from the IBM RS232 service unit, by the service technician or other personnel selecting and commanding the target or disk drive that is to be accessed. The incoming bit stream 52 contains a first byte that contains the switch command and a second byte that contains the address as to which target or disk drive with which the multiplexing system 44 is to be communicating and looking. The incoming bit stream 52 is inputted into a shift register 56. A clock generator 54 is used for operating the shift register 56 and for providing the timing for the inputting of the incoming bit stream 52.

The multiplexer controller data 60 is initialized to a certain value so that the multiplexing system 44 directs the service unit (IBM RS232 service unit) to be looking at and accessing/communicating to a particular current target or disk drive. The multiplexer controller 50 receives the incoming bit stream 52 from the service unit (IBM RS232) via the service interface 42 and the link 41. The incoming bit stream 52 has a particular value, such as a switch command for the first byte and the target address location for the second byte. At the appropriate time, the incoming bit stream 52 is compared with the current multiplexer controller data 60 by the use of a comparator 58. If the incoming bit stream 52 (such as the target address information for the second byte of data) is the same as the current multiplexer controller data 60, then a switch command 62 is not activated, and the multiplexing system 44 directs the service unit (IBM RS232 service unit) to continue to look at and access/communicate with the same current target or disk drive. On the other hand, if the incoming bit stream 52 (such as the target address information for the second byte of data) is different from the current multiplexer controller data 60 (current target address information), then a switch command 62 is activated, and the multiplexing system 44 directs the service unit (IBM RS232 service unit) to switch looking and accessing/communicating with the current target or disk drive and to start looking and accessing/communicating with the target or disk drive commanded and identified by data (i.e. the second byte of data) within the incoming bit stream 52.

The multiplexer controller data 60 takes on the new value of the identification of the switched target or disk drive (i.e. the second byte of data from the incoming bit stream 52). The multiplexer controller data 60 is communicated from the multiplexer controller 50 to the outgoing multiplexer 46 and the in-going multiplexer 48. Based on the new value of the multiplexer controller data 60, the multiplexers 46 and 48 switch to respectively transmitting to and receiving data from the new desired and commanded target or disk drive.

For example, the first byte of the incoming bit stream 52 sets the switch command, that is, identifies the following data in the second byte as switch command data. The second byte of the incoming bit stream 52 identifies the target address information, that is, the data that designates the disk drive to be accessed. Values of the multiplexer controller data 60 is set up to become equal to the current second byte data of the incoming bit stream 52, and values of the multiplexer controller data 60 control at which target or disk drive the multiplexing system 44 is to be looking or accessing. The values of the multiplexer controller data 60 and the second byte are compared. If the values are the same, the values of the multiplexer controller data 60 are not changed, and the multiplexing system 44 continues to look at and access the same target or disk drive. On the other hand, if the values are different, the values of the multiplexer controller data 60 value are changed to the same value of the current second byte data, and the multiplexing system 44 switches to looking at and accessing the new target or disk drive identified by the current second byte data. As one example, the target address information defined in the multiplexer controller data 60 and the second byte data may be a 01 value to command looking at the first disk drive 14, a 02 value to command looking at the second disk drive 20, a 03 value to command looking at the third disk drive 26, and so on and so forth. The multiplexer controller data 60 may be initialized to a value of 01 for looking at and accessing/communicating with the first disk drive 14. The first byte of the incoming bit stream 52 identifies a switch command, and the second byte of the incoming bit stream 51 is defined as the target address information or the data that designates the disk drive to be accessed.

If the second byte of the incoming bit stream 52 has a value of 01, then the multiplexer controller 50 maintains the multiplexer controller data 60 with a value of 01, and the multiplexers 46 and 48 continue to respectively transmit to and receive data from the first disk drive 14. The multiplexer controller data 60 is maintained with this 01 value as long as the second byte of the incoming bit stream 52 has a value of 01. On the other hand, if the incoming bit stream 52 changes to having a value of 03, then the comparison resulting in a difference between the second byte of the incoming bit stream 52 and the multiplexer controller data 60 causes the switch command 62 to be activated. The multiplexer controller data 60 is then switched from having a value of 01 to a value of 03. The multiplexer controller data 60 with a value of 03 is communicated to the multiplexers 46 and 48. The multiplexers 46 and 48 switch to respectively transmitting data to and receiving data from the third disk drive 26.

While the invention has been particularly shown and described with reference to a preferred embodiment, it will be understood by those skilled in the art that various changes in form and detail may be made therein without departing from the spirit and scope of the invention.

What is claimed is:

1. A multiplexing system for servicing a selected, serially linked target from a multiple number of serially linked targets comprising:

a multiplexer controller for controlling communications and switching access to the selected target wherein the multiplexer controller is able to couple to a single service interface, a transmitting multiplexer coupled to the multiplexer controller and able to couple to service interfaces of the multiple number of serially linked targets wherein the multiplexer controller controls the transmitting multiplexer to transmit data to the selected target, and a receiving multiplexer coupled to the multiplexer controller and able to couple to the service interfaces of the multiple number of serially linked targets wherein the multiplexer controller controls the receiving multiplexer to receive data from the selected target; and wherein the multiplexer controller, the transmitting multiplexer, and the receiving multiplexer are communicatively coupled to the single service interface.

2. The multiplexing system according to claim 1 further comprising a service unit communicatively coupled to the single service interface.

3. The multiplexing system according to claim 2 wherein the service unit is directly coupled to the single service interface and directly communicates thereto.

4. The multiplexing system according to claim 2 wherein the single service interface is coupled to a remote communications unit and the service unit remotely communicates to the single service interface via the remove communications unit.

5. The multiplexing system according to claim 2 wherein the service interfaces of the multiple number of targets and the single service interface are RS232 service interfaces and wherein the service unit is a RS232 service unit.

6. The A multiplexing system according to claim 1 wherein the multiple number of serially linked targets is a multiple number of serially linked direct access storage devices.

7. The multiplexing system according to claim 1 further comprising service interfaces of various computer devices are able to communicatively couple to the transmitting multiplexer and the receiving multiplexer.

8. The multiplexing system according to claim 7 wherein one of the various computer devices is a computer controller card.

9. A multiplexing system for servicing a selected, serially linked target from a multiple number of serially linked targets, comprising:
   a multiplexer controller for controlling communications and switching access to the selected target wherein the multiplexer controller is able to couple to a single service interface,
   a transmitting multiplexer coupled to the multiplexer controller and able to couple to service interfaces of the multiple number of serially linked targets wherein the multiplexer controller controls the transmitting multiplexer to transmit data to the selected target, and
   a receiving multiplexer coupled to the multiplexer controller and able to couple to the service interfaces of the multiple number of serially linked targets wherein the multiplexer controller controls the receiving multiplexer to receive data from the selected target;
   wherein the multiplexer controller further comprises:
      a shift register that couples to the single service interface and receives an incoming data stream having selected target information therefrom,
      a clock generator coupled to the shift register and the incoming data stream for allowing the shift register to operate,
      a multiplexer controller data unit for storing and transmitting multiplexer controller data command to the transmitting multiplexer and the receiving multiplexer wherein the multiplexer controller data command controls the transmitting and receiving of data to and from a selected target,
      a comparator for comparing the selected target information in the shift register with the multiplexer controller data command in the multiplexer controller data unit, and
      a switch command unit coupled to the comparator and the multiplexer controller data unit wherein the switch command unit is activated to switch targets when the selected target information from the incoming data stream is different than the multiplexer controller data command in the multiplexer controller data unit.

10. A method of multiplexing and switching access and communications between a multiple number of serially linked targets comprising the steps of:
   coupling service interfaces of the multiple number of serially linked targets to a transmitting multiplexer and a receiving multiplexer,
   coupling the transmitting multiplexer and the receiving multiplexer to a multiplexer controller having a single service interface that is able to couple to a service unit,
   coupling the transmitting multiplexer and the receiving multiplexer to the single service interface,
   receiving a select target command to the multiplexer controller,
   generating a multiplexer controller data command in response to the select target command, and
   directing access and communications by the transmitting multiplexer and the receiving multiplexer based on the multiplexer controller data command.

11. The method according to claim 10 wherein the directing step further comprises the steps of:
   setting the multiplexer controller data command to an initial value for directing the multiplexer controller to access and communicate with a current target,
   receiving a select target command from the single service interface,
   comparing the select target command with the multiplexer controller data command,
   determining whether the select target command is a new select target command that is different from the multiplexer controller data command,
   maintaining access and communications with the current target if the select target command is the same as the multiplexer controller data command, and
   generating the multiplexer controller data command as the new select target command and switching access and communications to a new select target based on the new select target command when the new select target command is different from the multiplexer controller data command.

12. The method according to claim 10 further comprising the step of:
   coupling the service unit to the single service interface.

13. The method according to claim 10 further comprising the step of:
   coupling a remote communications unit to the single service interface, and
   having the service unit remotely communicate with the remote communications unit for communicating with the multiplexer controller.

14. The method according to claim 10 further comprising the step of:
   coupling service interfaces from various computer devices.

15. The method according to claim 14 wherein the step of coupling service interfaces from various computer devices further comprises the step of:
   coupling a service interface from a computer controller card.

16. The method according to claim 10 wherein the step of sending a select target command further comprises the steps of:
   receiving an incoming data stream, and
   using at least a first byte of the incoming data stream to define the select target command.

17. A method of switching and accessing between a number of serially linked targets for servicing the targets comprising the steps of:
   generating select target values for each of the serially linked targets to be accessed and communicated for servicing,
   determining an initial select target value wherein an initial respective target based on the initial select target is to be accessed,
   setting a switch controller command to the initial select target value, receiving an incoming data stream having one of the select target values from a service unit, comparing the one of the select target values from the incoming data stream with the switch controller command, generating the switch controller command as the one of the select target values from the incoming data stream when the switch controller command is different from the one of the select target values, and switching access and communications to a respective target based on the one of the select target values when the switch controller command is different from the one of the select target values.

\* \* \* \* \*

UNITED STATES PATENT AND TRADEMARK OFFICE
CERTIFICATE OF CORRECTION

PATENT NO. : 6,704,330 B1  
DATED : March 9, 2004  
INVENTOR(S) : Albin et al.

Page 1 of 1

It is certified that error appears in the above-identified patent and that said Letters Patent is hereby corrected as shown below:

<u>Column 7,</u>  
Line 5, please delete the letter "A" in between "The" and "multiplexing".

Signed and Sealed this

Twenty-second Day of March, 2005

JON W. DUDAS  
*Director of the United States Patent and Trademark Office*